E. KEMPSHALL.
NON-SKIDDING TIRE.
APPLICATION FILED APR. 20, 1908.
917,613.
Patented Apr. 6, 1909.
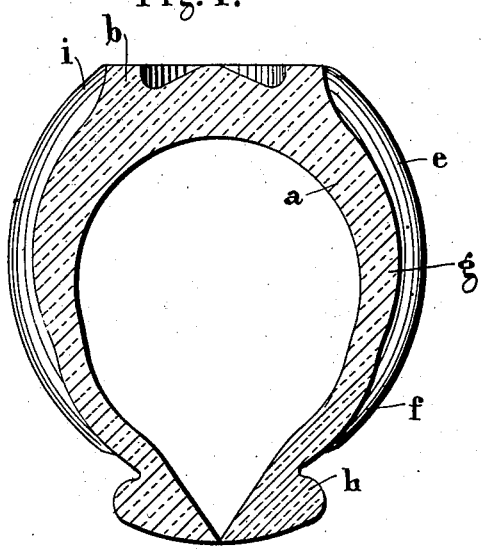
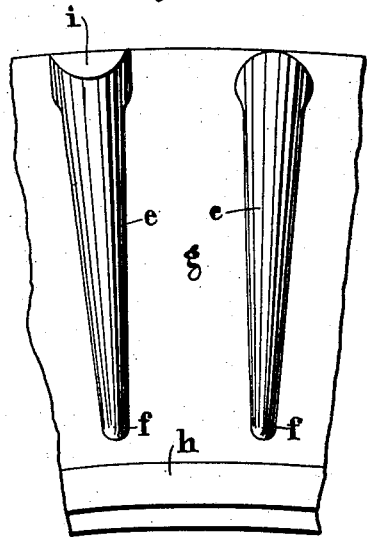
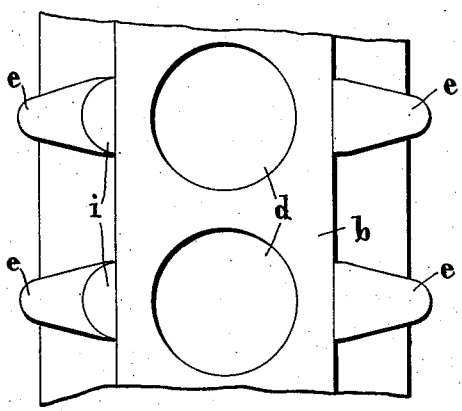
Witnesses:
F. R. Roulstone
W. P. Abell
Inventor
Eleazer Kempshall
by Wright Brown Quimby May
Attys.

UNITED STATES PATENT OFFICE.

ELEAZER KEMPSHALL, OF LONDON, ENGLAND.

NON-SKIDDING TIRE.

No. 917,613.  Specification of Letters Patent.  Patented April 6, 1909.

Application filed April 20, 1908. Serial No. 428,277.

*To all whom it may concern:*

Be it known that I, ELEAZER KEMPSHALL, a citizen of the United States of America, and residing at the Hotel Russell, Russell Square, London, W. C., England, have invented certain new and useful Improvements in Non-Skidding Tires, of which the following is a specification.

Pneumatic tires which have thickened tread portions, and sides or barrel portions which gradually taper in thickness toward the rim or felly, are admittedly advantageous as compared with tires which are of equal thickness throughout, or substantially so, especially for automobiles. But I have found that the heavy tread causes great stress to be thrown on the relatively weak side portions so as to frequently break the latter down.

When the tread surface of such a tire is formed with recesses which act as suction chambers when coming in contact with the road and when there is a tendency to skid that is resisted by the suction chambers, there is a still greater tendency to break the tire down along its weak side.

This invention relates to pneumatic tires of the general type above referred to and having a continuous flat tread surface in the form of a raised ridge provided with numerous recesses which act like suction chambers as the tire comes into contact with the road and prevents skidding or side-slipping.

The object of the present invention is to increase the strength of the tire and also to increase the cooling effect while running and the invention consists in providing a number of ribs extending from the sides of the ridge forming the tread for a considerable distance across the barrel portion of the tire.

Of the accompanying drawings which illustrate a tire constructed according to the invention—Figure 1, represents a cross-section. Fig. 2, a plan, and Fig. 3, a side elevation of a tire constructed in accordance with my invention.

In carrying out the invention a pneumatic tire having a thick tread portion $a$ and side or barrel portions $g$ which taper in thickness away from the tread, is provided with a raised ridge $b$ forming the tread surface, this ridge being provided with numerous recesses $d$ which act like suction chambers as the tire comes in contact with the road.

The sides of the ridge $b$ are buttressed by ribs $e$ extending down the sides of the barrel portion $g$ of the tire. These ribs may be beveled at their upper ends as indicated at $i$, or rounded, and they taper off toward their ends $f$ near the beaded or other edges $h$ of the tire.

The ribs $e$ not only greatly increase the strength of the tire but they offer considerable area of cooling surface to the air so as to prevent the tire becoming over-heated when running.

Another advantage of the ribs $e$ is that they distribute the stress of pressure from the thick tread to the thinner sides in substantial proportions to the tapering thickness of the side walls $g$, so that tendency of the thin portions to break down is overcome, and this without altering the relative resilience of different portions of the tire.

Having now described my invention, what I claim is:—

A pneumatic tire having a thick tread portion and sides which taper in thickness away from the tread, the tread being provided with a series of recesses, and a pair of side ribs on opposite sides of each recess, said ribs being tapering in thickness with their smaller or thinner ends near the edges of the tire, their thick outer ends joining the walls of the recesses and reinforcing them laterally.

In testimony whereof I have signed my name to this specification in the presence of two subscribing witnesses.

ELEAZER KEMPSHALL.

Witnesses:
 A. W. MATHYS,
 B. H. MATTHEWS.